United States Patent
Evans et al.

(10) Patent No.: US 10,785,902 B2
(45) Date of Patent: Sep. 29, 2020

(54) DYNAMIC LINKAGE FOR AGRICULTURAL IMPLEMENT TOOL GANG

(71) Applicant: Bigham Brothers, Inc., Lubbock, TX (US)

(72) Inventors: Samuel L. Evans, Little Rock, AK (US); Samuel D. Ashley, Lubbock, TX (US); Jimmy D. Gray, Jr., Lubbock, TX (US)

(73) Assignee: Bigham Brothers, Inc., Lubbock, TX (US)

( * ) Notice: Subject to any disclaimer, the term of this patent is extended or adjusted under 35 U.S.C. 154(b) by 70 days.

(21) Appl. No.: 16/162,220

(22) Filed: Oct. 16, 2018

(65) Prior Publication Data

US 2019/0116715 A1    Apr. 25, 2019

Related U.S. Application Data

(60) Provisional application No. 62/573,014, filed on Oct. 16, 2017.

(51) Int. Cl.
*A01B 61/04* (2006.01)
*A01B 49/02* (2006.01)
*A01B 13/08* (2006.01)

(52) U.S. Cl.
CPC ............ *A01B 61/046* (2013.01); *A01B 13/08* (2013.01); *A01B 49/027* (2013.01)

(58) Field of Classification Search
CPC ...... A01B 61/046; A01B 13/08; A01B 49/027
USPC ................................................ 172/265, 266
See application file for complete search history.

(56) References Cited

U.S. PATENT DOCUMENTS

| | | | |
|---|---|---|---|
| 2,906,353 A | 9/1959 | Rogers | |
| 2,944,613 A | 7/1960 | Anderson | |
| 3,084,749 A * | 4/1963 | Anderson | A01B 35/24 172/268 |
| 3,157,139 A * | 11/1964 | Spindler | A01B 13/08 111/123 |
| 3,321,027 A * | 5/1967 | Johnson et al. | A01B 61/046 172/260.5 |
| 3,486,566 A | 12/1969 | Nja | |
| 3,550,690 A | 12/1970 | Quanbeck | |
| 3,599,728 A | 8/1971 | Moe et al. | |
| 4,078,615 A | 3/1978 | Kelley | |
| 4,116,281 A | 9/1978 | Lant | |
| 4,117,889 A * | 10/1978 | Larson | A01B 69/004 104/244.1 |
| 4,128,130 A * | 12/1978 | Green et al. | A01B 61/048 172/266 |
| 4,236,583 A | 12/1980 | Geurts | |
| 4,318,524 A * | 3/1982 | Degelman | A01B 23/02 172/264 |

(Continued)

*Primary Examiner* — Tara Mayo-Pinnock
(74) *Attorney, Agent, or Firm* — Law Office of Mark Brown, LLC; Mark E. Brown

(57) ABSTRACT

A dynamic linkage for a tool gang on a multi-row agricultural implement. The tool gang can include one or more ground-working or other agricultural tools, which are mounted on a tool gang frame. The tool gang frame is connected to a toolbar by the dynamic linkage, each includes adjusting mechanisms for limiting vertical travel and down-pressure forces applied to the tools. The dynamic linkage is configured for tripping to raise the tool gang for clearing a surface or subsurface obstacle.

4 Claims, 10 Drawing Sheets

(56) References Cited

U.S. PATENT DOCUMENTS

| | | | |
|---|---|---|---|
| 4,407,207 A * | 10/1983 | Dreyer | A01C 5/06 |
| | | | 111/136 |
| 4,548,277 A | 10/1985 | Dietrich, Sr. et al. | |
| 4,564,074 A | 1/1986 | Ryan | |
| 4,601,248 A | 7/1986 | Beasley | |
| 4,834,189 A | 5/1989 | Peterson et al. | |
| 5,333,559 A | 8/1994 | Hodapp et al. | |
| 5,560,433 A | 10/1996 | Grimm et al. | |
| 6,761,120 B2 | 7/2004 | Kovach et al. | |
| 9,144,191 B1 | 9/2015 | Gramling et al. | |
| 2012/0168186 A1 * | 7/2012 | Kile | A01B 23/02 |
| | | | 172/389 |
| 2013/0112123 A1 | 5/2013 | Turko et al. | |
| 2019/0116715 A1 * | 4/2019 | Evans et al. | A01B 61/046 |

\* cited by examiner

DYNAMIC LINKAGE FOR AGRICULTURAL IMPLEMENT TOOL GANG

CROSS-REFERENCE TO RELATED APPLICATION

This application claims priority in U.S. Provisional Patent Application No. 62/573,014, filed Oct. 16, 2017, which is incorporated herein by reference.

BACKGROUND OF THE INVENTION

1. Field of the Invention

The present invention relates generally to agricultural farm equipment and, in particular, to dynamic linkage for an agricultural implement tool gang.

2. Description of the Related Art

Agricultural implements include equipment configured for towing behind tractors and self-propelled units. Common field operations include tilling, seed bed formation, planting, weed control, fertilizing, spraying (e.g., nutrients, herbicides, pesticides, etc.) and harvesting. Row-crop procedures typically utilize implements with multiple gangs of task-specific tools. For example, typical multi-row cultivators include horizontal toolbars extending transversely to the crop rows and mounting multiple gangs of task-specific tools. Such tools can include coulters, barring-off discs, packer wheels, chisels, fertilizer knives and weed-cutting sweeps. The tool gangs are often reconfigured for specific tasks during the crop seasons.

Tilling and cultivating operations typically form furrows receiving crop seeds at spaced intervals, whereafter the topsoil is closed over the resulting seed beds. Nutrients can be deposited in the furrows to facilitate seed germination and plant growth, where a uniform furrow is preferred for optimal planting. However, undulating, multi-level field conditions can compromise cultivation, plowing and planting results. For example, rigidly-mounted tool gangs tend to be less effective in uneven field conditions. Dynamic floating and contour-following implements have been developed for accommodating such conditions.

Obstacles, such as subsurface rocks, trees and other debris, are a common hazard for ground-working agricultural implements. The tools can be broken, bent and otherwise damaged upon striking such obstacles. Such incidents can necessitate expensive repairs and equipment downtime. Various dynamic, flexible tool-mounting systems have been developed for protecting tools from obstacles above and below grade.

Heretofore there has not been available a dynamic linkage for an agricultural implement tool gang with the advantages and features of the present invention.

SUMMARY OF THE INVENTION

The present invention provides a dynamic linkage for a tool gang of an agricultural implement, which maintains consistent furrow depth across multiple crop rows, for example, in a multi-row implement application. The dynamic linkage also accommodates surface and subsurface obstacle strikes, while protecting the ground-working tools from damage. The linkage is adjustable for applications in various field conditions with a variety of implements and tools.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

Figure 1:
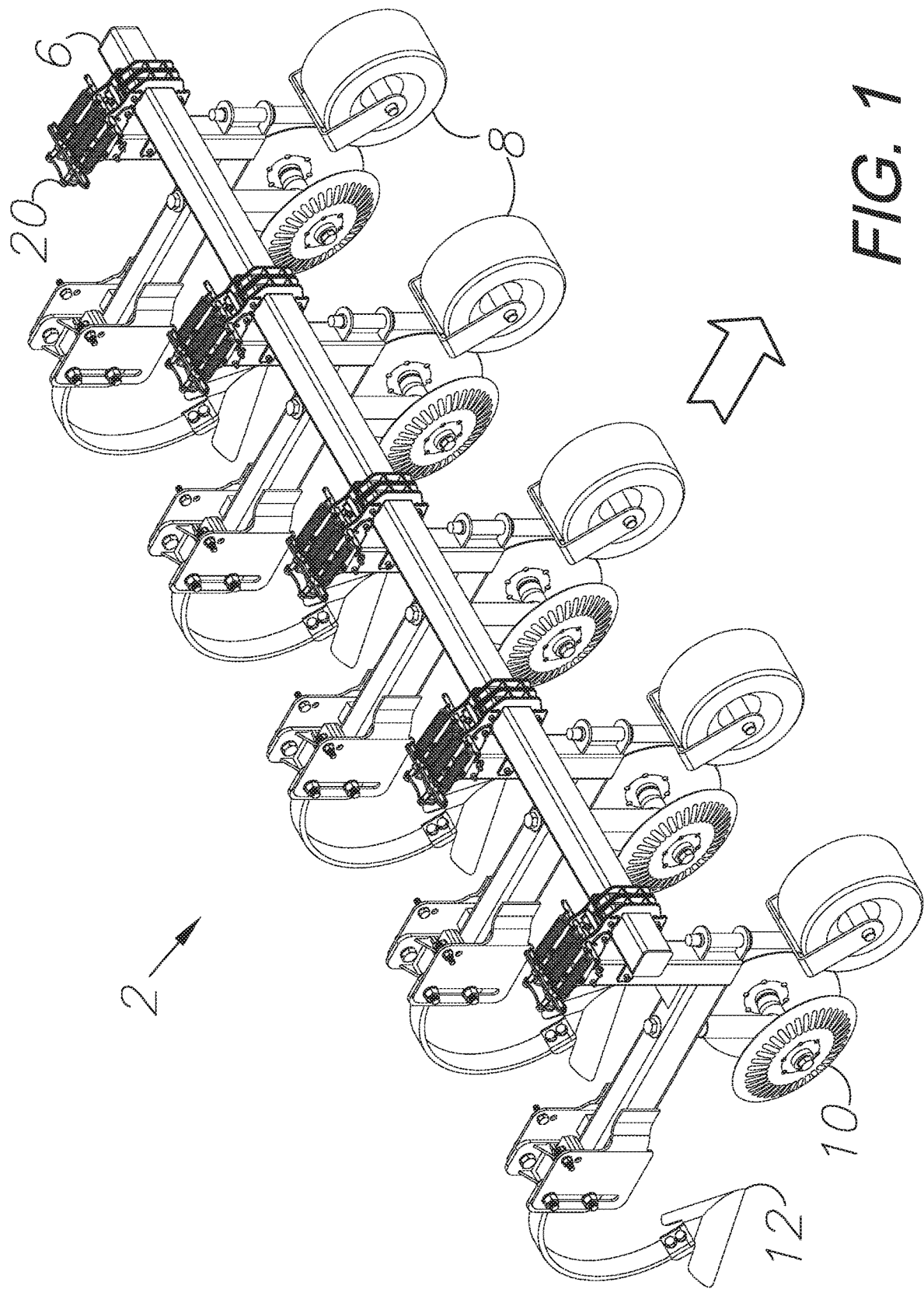
FIG. 1 is an upper, front, right-side perspective view of a portion of a multi-row tillage implement comprising a combination cultivator and lister, with dynamic linkages embodying an aspect of the present invention.
Figure 2:
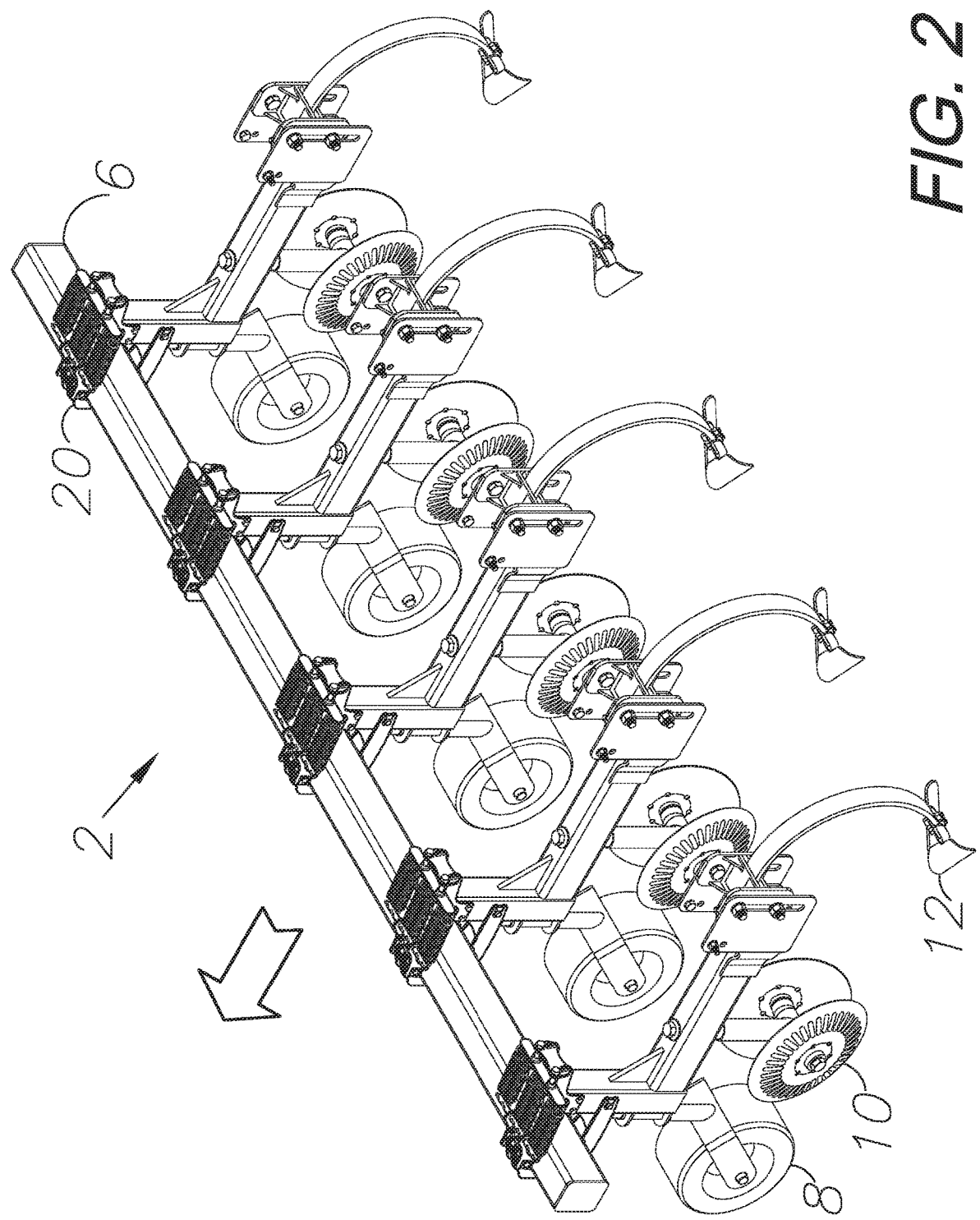
FIG. 2 is an upper, rear, left-side perspective view thereof.

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right, and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Agricultural Implement 2

Referring to the drawings in more detail, the reference numeral 2 generally designates a multi-row agricultural implement. Without limitation on the range of suitable applications for the present invention, the implement 2 is configured as a combination cultivator and lister, with multiple tool gangs 4 mounted on a toolbar 6. The toolbar 6 is connected to a tow vehicle, such as a tractor. Alternatively, self-propelled agricultural equipment can be equipped with the linkage of the present invention.

Each tool gang 4 includes a leading depth gauge wheel 8, a pair of barring-off discs 10 and a trailing sweep 12 configured for cutting weeds in furrows opened by the barring-off discs 10. The wheel 8, discs 10 and the sweep 12 are mounted on and depend downwardly from a tool gang subframe 14, which includes: a generally horizontal beam 16 mounting the sweep 12 at its rear end; and a generally vertical column 18 mounted on and extending upwardly from the front end of the beam 16.

Implements and tool gangs can be configured with a wide variety of ground-working tools in various applications of the present invention. Additional tools can include, without limitation, coulters, chisels, fertilizer knives, (clod) busters, planters and other task-specific equipment. The gangs 4 can be adjustably mounted on the toolbar 6 for adjusting the spacing therebetween to accommodate different crop row spacings.

III. Dynamic Linkage 20

Figure 5:
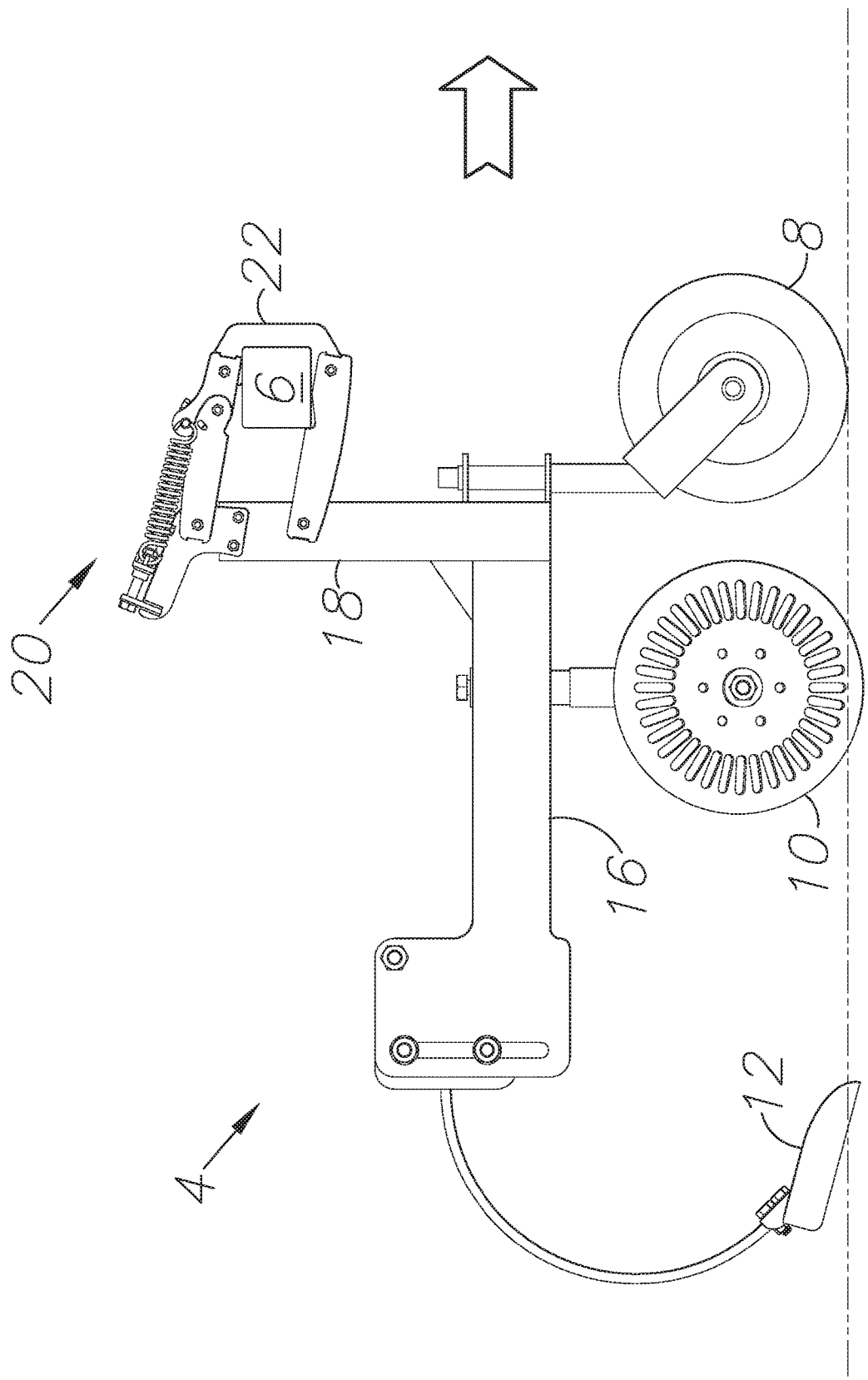
FIG. 5 is a right-side elevational view, showing the tool gang in a raised position.
Figure 6:
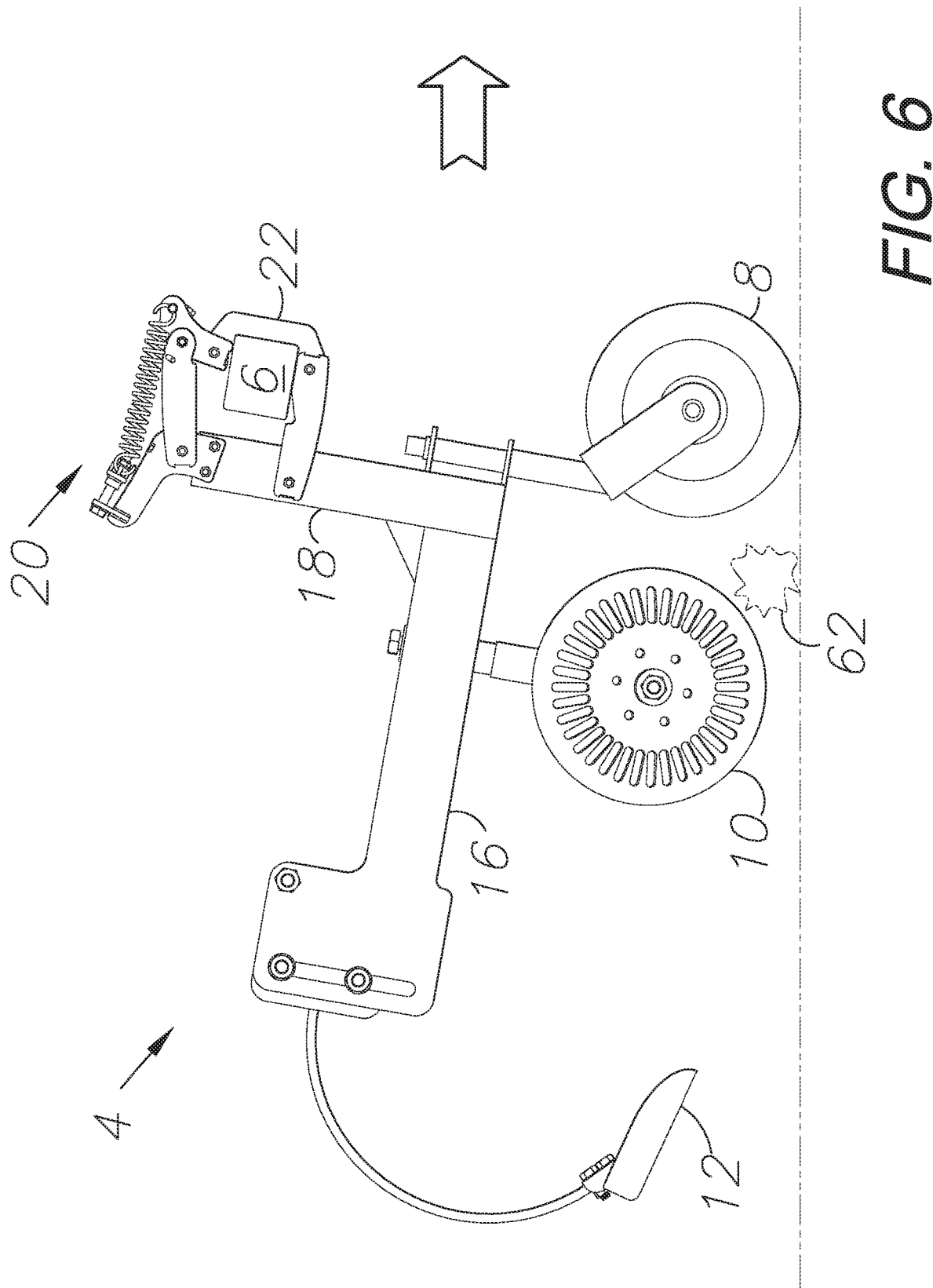
FIG. 6 is a right-side elevational view, showing the tool gang in a raised position with the dynamic linkage scissored upwardly for clearing a subsurface obstacle.
Figure 7:
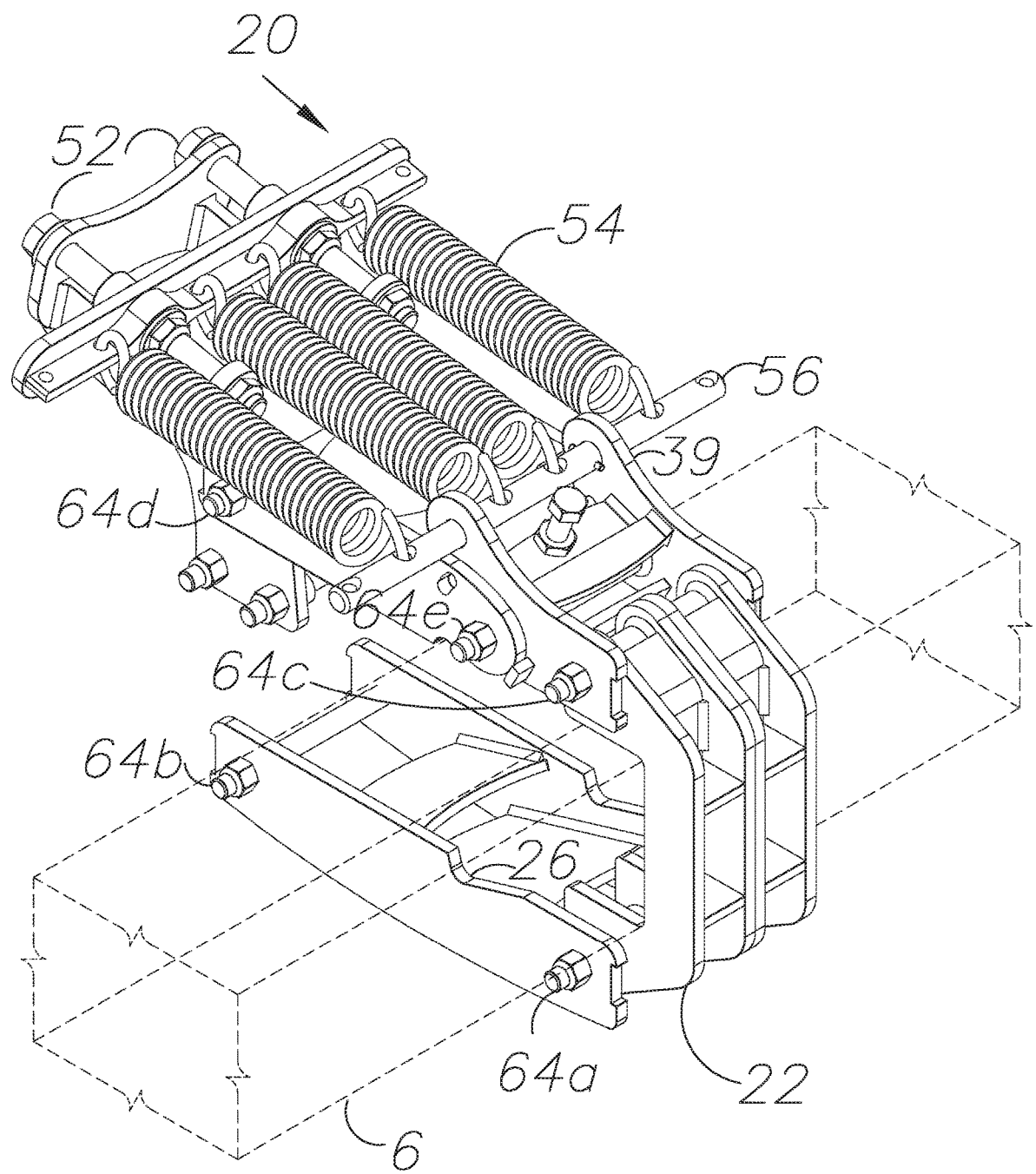
FIG. 7 is an upper, right-side, front perspective view of the linkage.

Each tool gang 4 is mounted on the toolbar 6 by a dynamic linkage 20. As shown in FIG. 7, the dynamic linkage 20 includes a pair of front brackets 22, which can be rigidly mounted by U-bolts 24 retaining the toolbar 6 in rearwardly-open bracket notches 26. A lower connector 28 includes a pair of lower connector side plates 30, each including an upwardly-open notch 32 which receives a lower, rear edge of the toolbar 6 when the tool gang 4 swings upwardly (FIGS. 5 and 6). The lower connector side plates 30 are separated and maintained in parallel relation by crosspieces 34.

Figure 3:
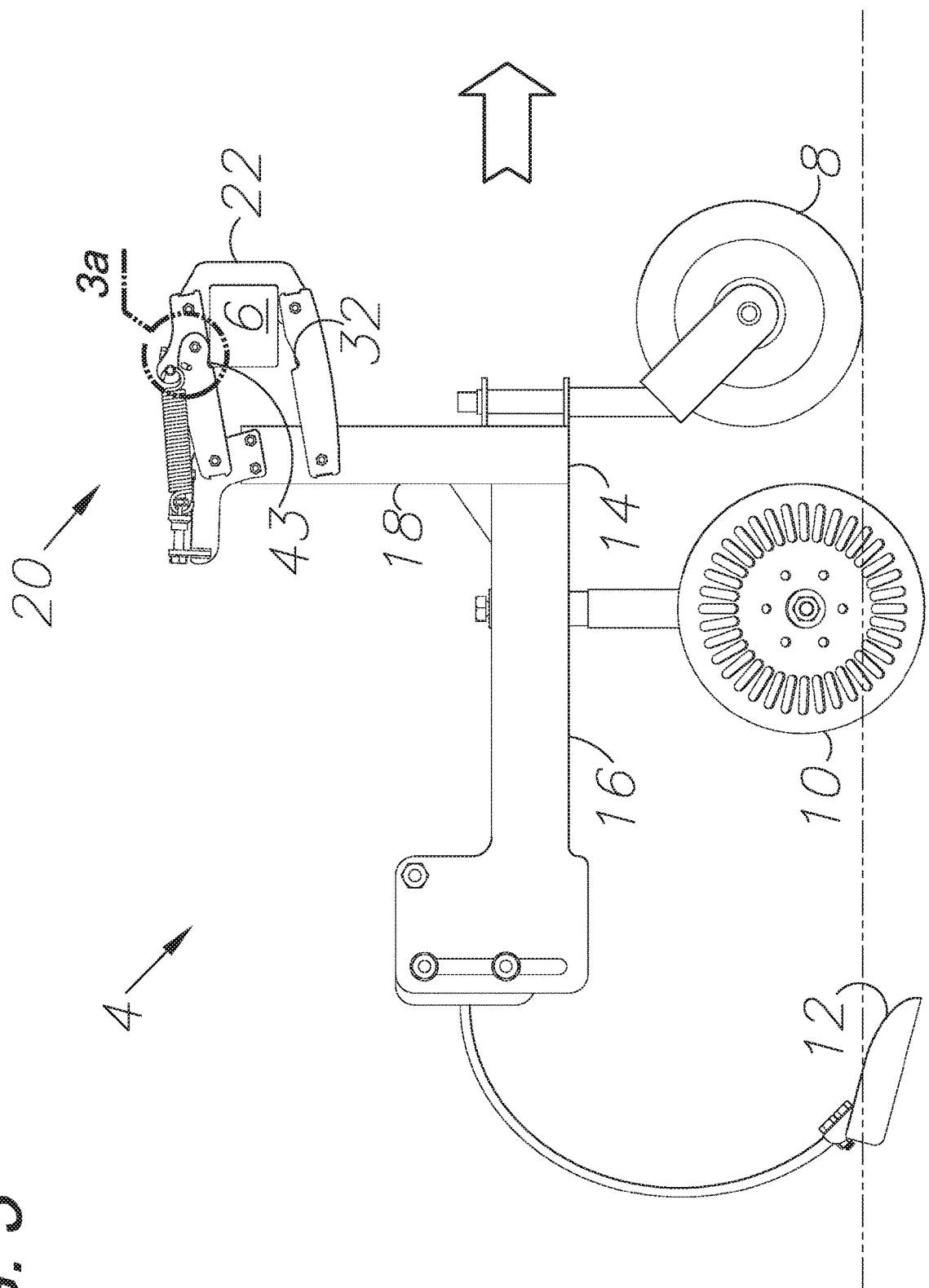
FIG. 3 is a right-side elevational view, showing a tool gang in a lower (operating) position.
Figure 3A:
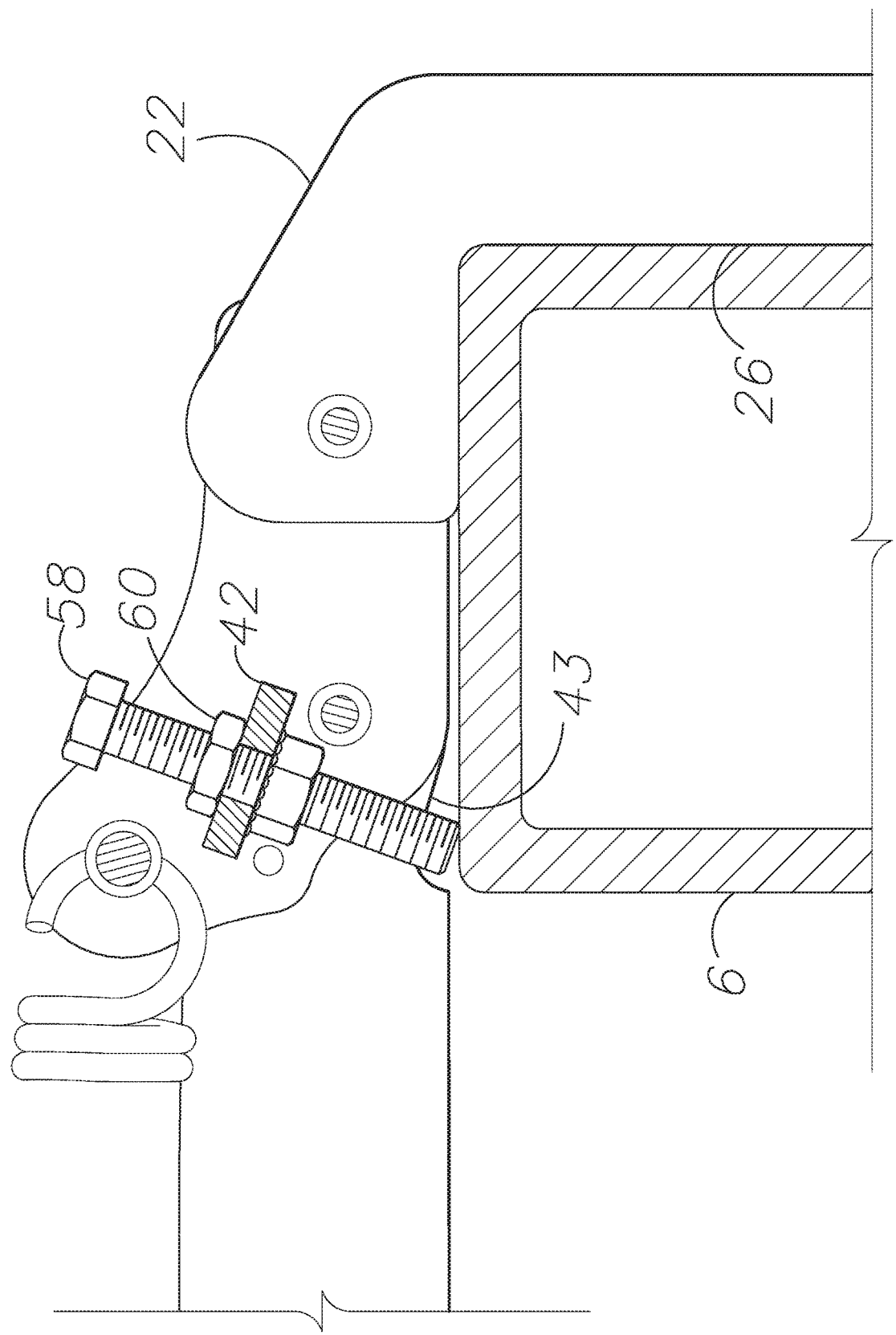
FIG. 3a is an enlarged, cross-sectional detail taken generally within circle 3a in FIG. 3.

The dynamic linkage 20 further includes an upper, articulated connector 36 with front and rear upper connector legs 38, 40 including side plates 39, 41 respectively. Each rear, upper, connector bracket 40 includes a downwardly-open notch 43, which selectively receives an upper, rear, corner edge of the toolbar 6 when the tool gang 4 swings downwardly (FIG. 3). Crosspieces 42 extend between the side plates 39, 41.

Figure 8:
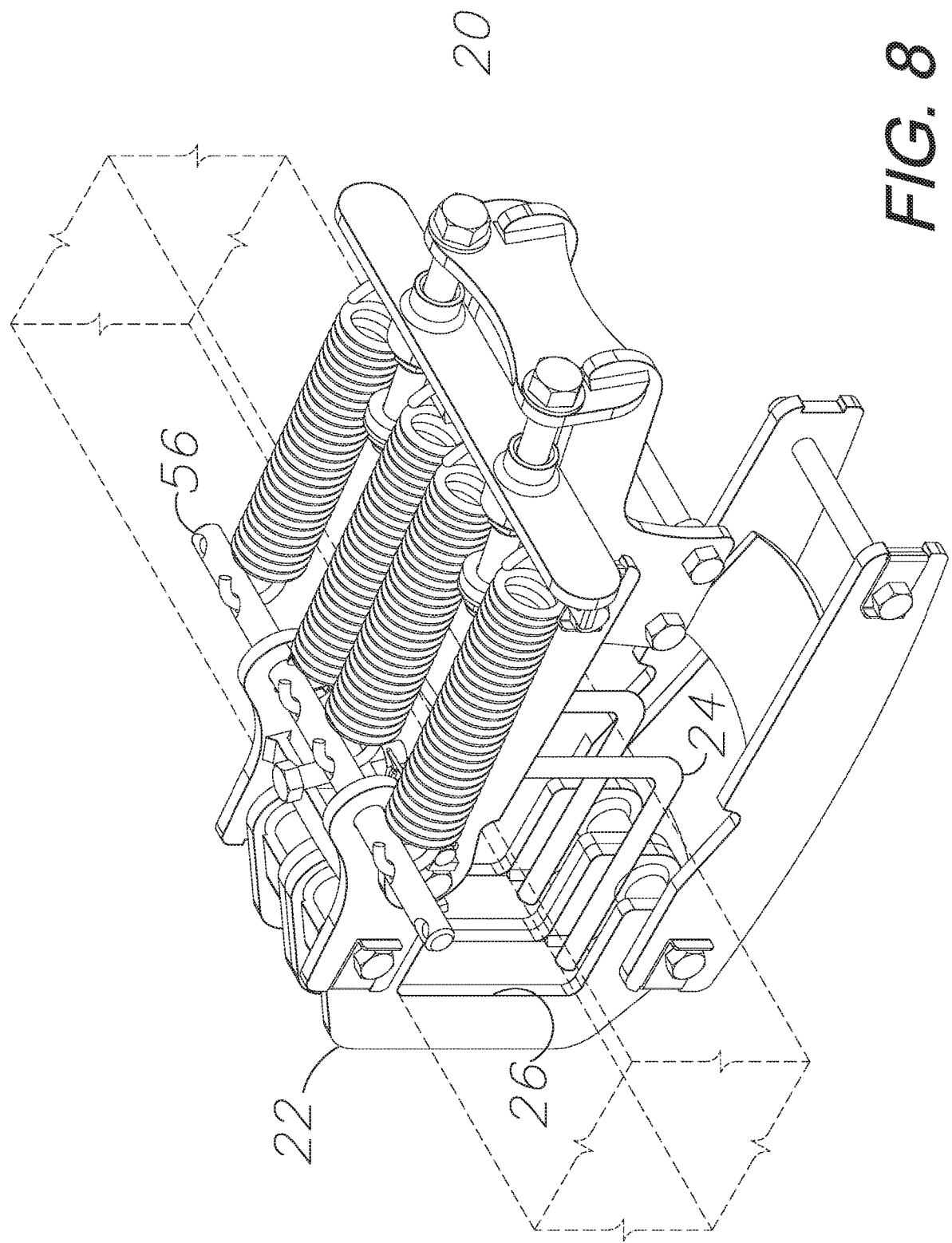
FIG. 8 is an upper, left-side, rear perspective view of the linkage.
Figure 9:
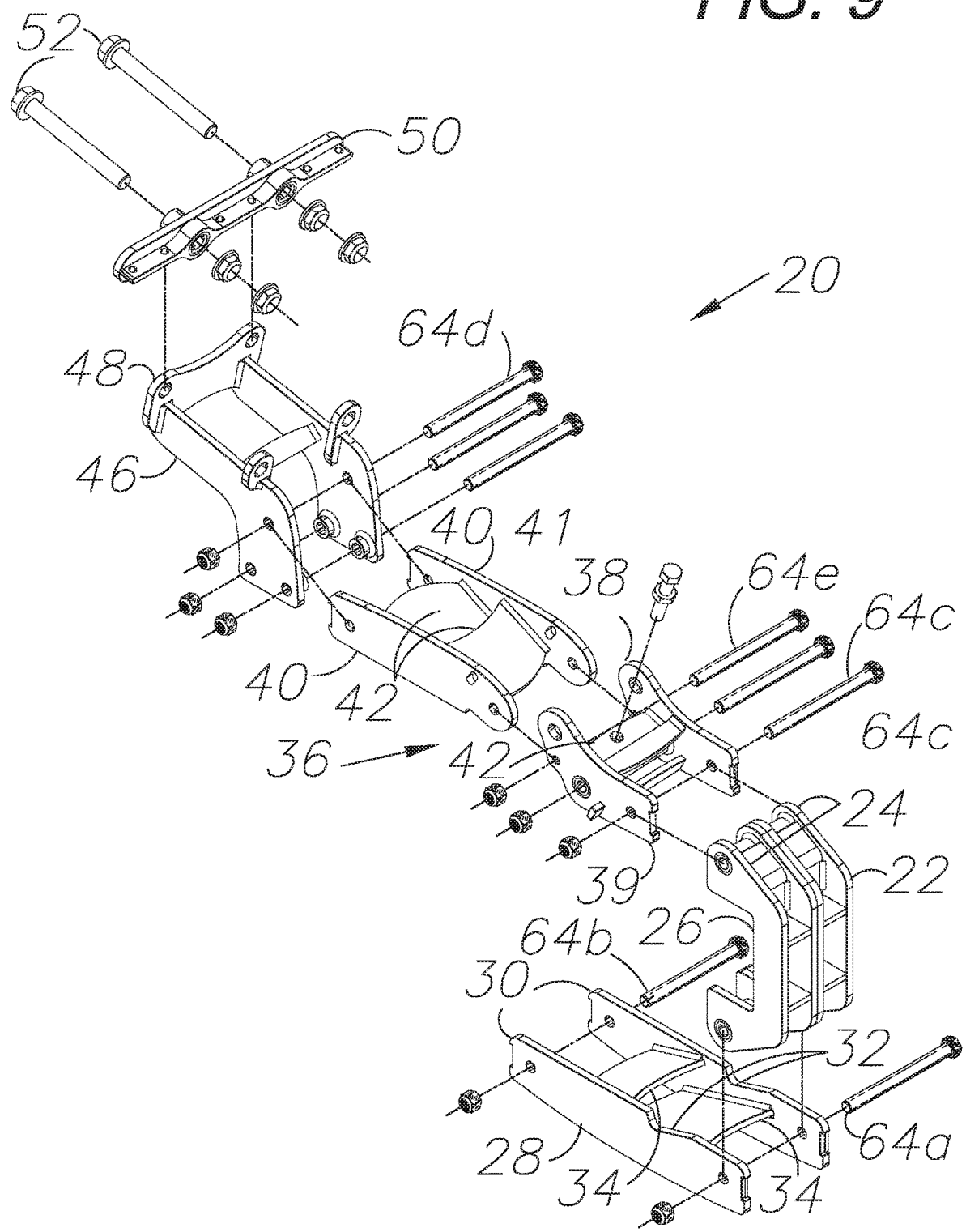
FIG. 9 is an exploded, perspective view of the linkage.

Each linkage 20 includes a spring subassembly 44 with a pair of extensions 46 mounted on opposite sides of the upper end of the column 18 and extending upwardly and rearwardly therefrom. The extensions 46 mount a rear, transverse anchor 48. The rear anchor 48 is connected to a transverse, rear spring retainer 50 by a pair of spring tensioning bolts 52, which enable adjusting the tension in the springs 54. The spring subassembly 44 includes four tension springs 54, which hook at their back ends into the rear anchor 48. The tension spring 54 front ends hook into a transversely-extending front anchor shaft 56, which extends transversely through openings at the rear of each upper connector front bracket side plate 39 (FIGS. 7 and 8). More or fewer tension springs 54 can be utilized, depending on field conditions, tool gang 4 configurations, tripping-force settings for the linkage 20, and other factors. The spring constants for the tension springs 54 can also be varied as necessary.

The dynamic linkage 20 includes a vertical travel limit bolt 58 threadably received in a crosspiece 42 extending between the front legs 38 of the upper connector 36 (FIG. 7) and selectively engaging the toolbar 6. The bolt 58 can be locked in place by a locking nut 60. The limit bolt 58 can be extended downwardly to elevate the fulcrum of the articulated upper connectors 36, which reduces the tripping force needed to scissor the upper connectors 36, e.g., in an obstacle-avoiding function (FIG. 6). Conversely, retracting the limit bolt 58 upwardly lowers the fulcrum, thus requiring greater impact force before the linkage 20 trips and scissors the upper connectors 36.

The linkage 20 defines five transverse pivotal axes through bolts in its lower and upper connectors 28, 36. Lower front bolt 64a pivotally connects the front brackets 22 with the front end of the lower connector 28. Lower rear bolt 64b pivotally connects the subframe column 18 with the rear end of the lower connector 28. The lower connector 28 is pivotally connected at its front and rear ends to the front brackets 22 and the column 18 by bolts 64A, 64B respectively. The upper connector 36 is connected and its front and rear ends to the front brackets 22 and the upper end of the column 18 by bolts 64c, 64d, respectively. The upper connector front and rear legs 38, 40 are pivotally connected by the fifth bolt 64a.

IV. Operation

In operation, the tool gangs 4 are fitted with appropriate toolsets, typically including ground-working tools such as chisels, discs, coulters, knives, etc. Appropriate adjustments are made to accommodate field conditions, optimize specific operations, adapt to agricultural equipment, etc., with the overall goal of maximizing return on optimal crop production. For example, as described above, the linkage 20 functions can be adjusted. For example, the tension in the spring subassembly 44 is adjustable via the spring tensioning bolts 52, and by substituting springs with different characteristics. Moreover, the linkage 20 tripping function (upper connector 36 scissoring) can be adjusted with the limit bolt 58.

Figure 4:
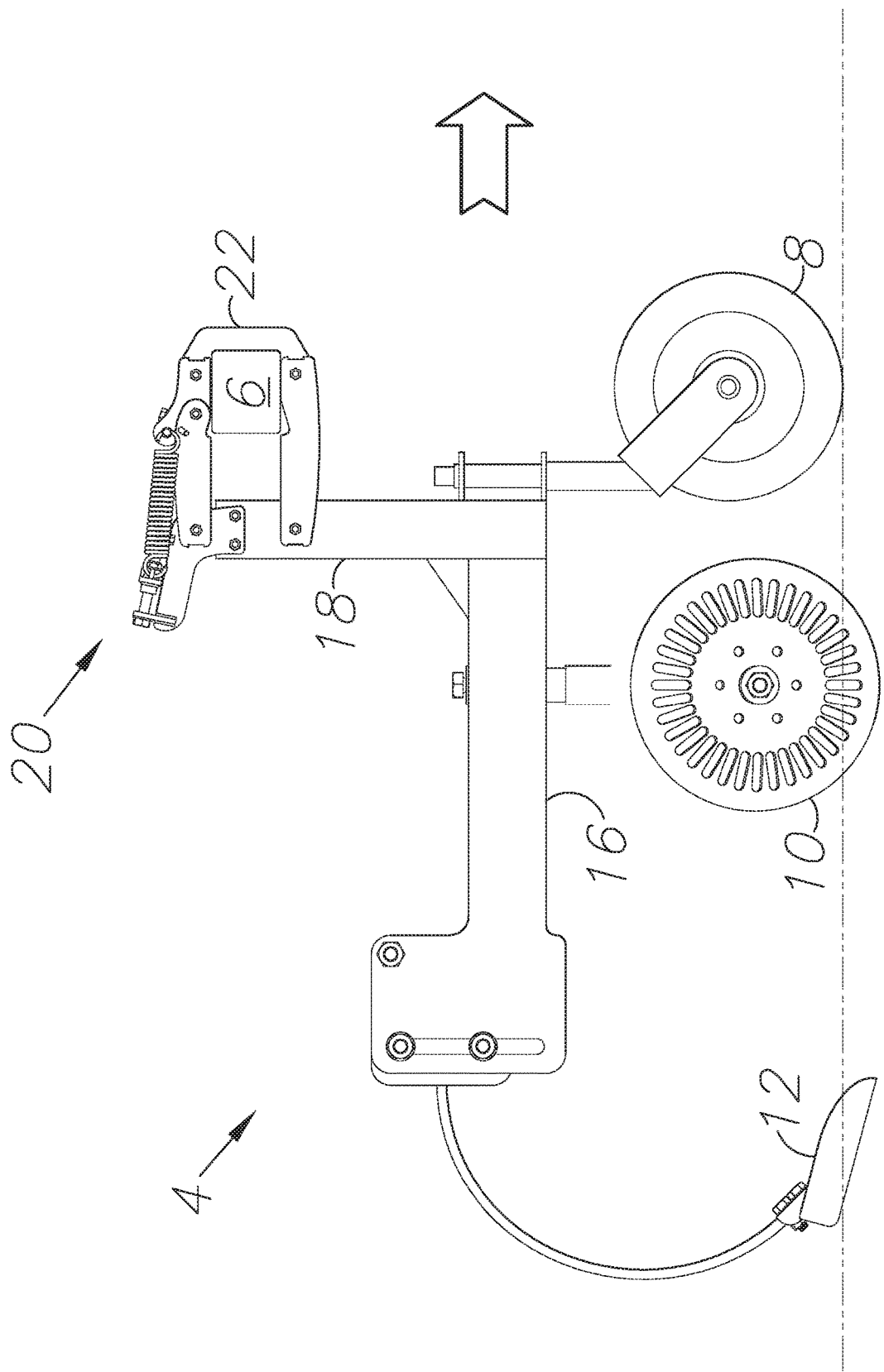
FIG. 4 is a right-side elevational view, showing the tool gang in a middle, floating position.

FIG. 3 shows a tool gang 4 in a lower, ground-working position, with the barring-off discs 10 and the sweep 12 partially buried subsurface in a furrow. FIG. 4 shows the tool gang 4 in a midway-elevated position. FIG. 5 shows a relatively high position, e.g., on the verge of tripping. The tripped position is shown in FIG. 6, whereby the discs 10 and the sweep 12 are positioned for clearing a subsurface rock or other obstacle 62.

The transverse-axis pivotal connections defined by the bolts 64a-e enable the multi-function operation of the linkage 20. In normal field operations (FIGS. 3-5) the pivotal connections define the corners of a parallelogram formed by the front brackets 22, the column 18 and the lower and upper connectors 28, 36. Normal field undulations and elevational changes are thus accommodated by the linkage parallelograms reconfiguring, raising and lowering the tool gang 4 relative to the toolbar 6. When a tool engages a surface or subsurface obstacle, the upper connectors 36 scissor, with the pivotal axis formed by the fifth bolt 64e thrusting upwardly (FIG. 6), whereby the tool in contact clears the obstacle without damage.

It is to be understood that while certain aspects of the disclosed subject matter have been shown and described, the disclosed subject matter is not limited thereto and encompasses various other embodiments and aspects.

Having thus described the disclosed subject matter, what is claimed as new and desired to be secured by Letters Patent is:

1. An agricultural implement comprising:
   a toolbar configured for connection to a vehicle and extending transversely to a vehicle direction-of-travel;
   a tool gang including a ground-working tool and a structural member mounting said tool; and
   a dynamic linkage connecting said toolbar and said tool gang member, which linkage includes:
      a bracket fixedly connected to said toolbar and including upper and lower ends above and below said toolbar respectively;
      an upper connector with a front end pivotally connected to said bracket upper end and a rear end pivotally connected to said tool gang member;
      a lower connector with a front end pivotally connected to said bracket lower end and a rear and pivotally connected to said tool gang member;

said pivotal connections generally forming a four-sided trapezoid with a respective pivotal connection at each corner;

said tool gang member raising and lowering by displacing said pivotal connections relative to each other;

said upper connector including front and rear legs pivotally connected between said frame member and said bracket;

said upper connector configured for scissoring with said legs displaced upwardly at said pivotal connection between said legs;

said tool gang structural member including a generally horizontal beam with front and rear ends;

said tool mounted on and depending downwardly from said beam; and said structural member including a generally vertical column extending upwardly from said beam.

2. The agricultural implement according to claim 1, wherein said linkage includes:

a spring with a front end connected to said linkage upper connector and a rear end connected to said structural member; and said spring configured for biasing said tool upwardly upon encountering a field obstacle.

3. The agricultural implement according to claim 2, which includes:

said linkage having an adjustable tripping force associated with said tool encountering a field obstacle; and said linkage upper connector configured for scissoring upwardly upon said tripping force exceeding a preset, adjustable tripping force.

4. The agricultural implement according to claim 3, which includes:

a lower front fastener pivotally connecting said bracket lower end and said lower connector front end, said lower front faster defining a first pivotal axis;

a lower rear connector pivotally connecting said column and said lower connector rear end, said lower rear connector defining a 2nd pivotal axis;

an upper front fastener pivotally connecting said bracket upper end and said upper connector front end, said upper front connector defining a 3rd pivotal axis;

an upper rear fastener pivotally connecting said column and said upper connector rear end, said upper rear connector defining a 4th pivotal axis; and an upper connector fastener pivotally connecting said upper connector legs and defining a 5th pivotal axis.

* * * * *